L. W. CLASKA.
TIRE CHAIN.
APPLICATION FILED JUNE 15, 1915.
1,165,153.
Patented Dec. 21, 1915.
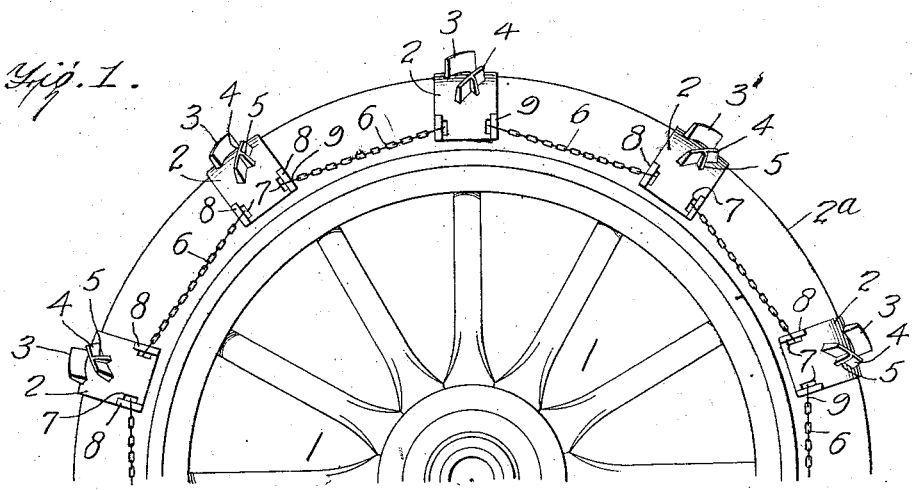
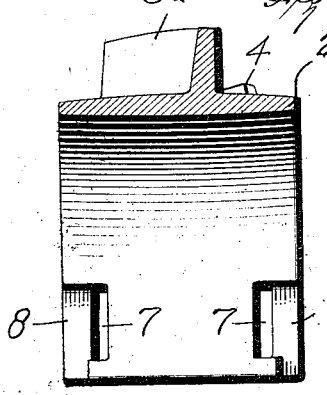
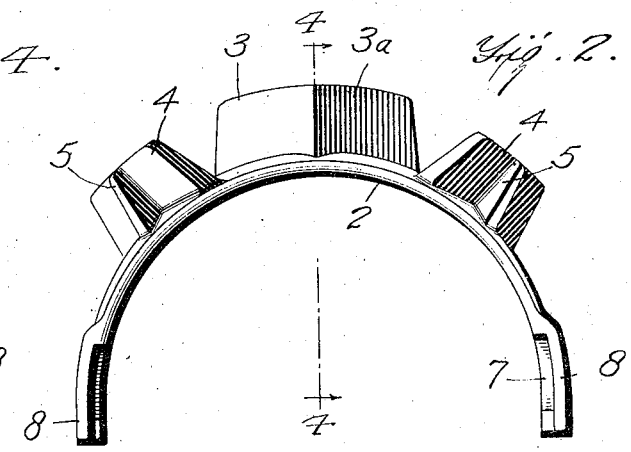
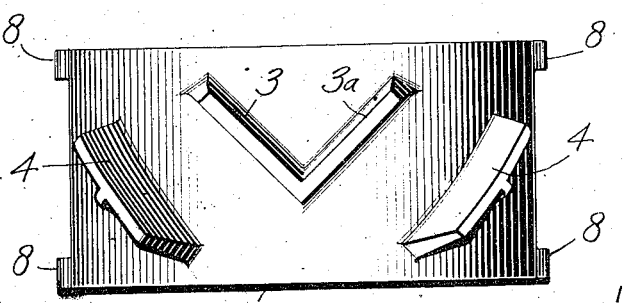
WITNESSES:
INVENTOR
LEE W. CLASKA,
BY Munn & Co.
ATTORNEYS

UNITED STATES PATENT OFFICE.

LEE W. CLASKA, OF GARDEN VALLEY, IDAHO.

TIRE-CHAIN.

1,165,153.  Specification of Letters Patent.  Patented Dec. 21, 1915.

Application filed June 15, 1915. Serial No. 34,236.

*To all whom it may concern:*

Be it known that I, LEE W. CLASKA, a citizen of the United States, and a resident of Garden Valley, in the county of Boise and State of Idaho, have invented a new and useful Improvement in Tire-Chains, of which the following is a specification.

My invention is an improvement in tire chains, and the invention has for its object to provide a device of the character specified, capable of being attached to any construction of pneumatic tire or detached therefrom, wherein a series of gripping devices is provided, each in the form of an arc-shaped plate or clip having spurs or lugs on its convex face and adapted to be arranged transversely of the tread of the tire, the said plates being connected together by flexible members on opposite sides of the tire, and wherein mechanism is provided in connection with the flexible members for permitting the device to be placed on the tire or removed therefrom.

In the drawings:—Figure 1 is a partial side view of a wheel provided with the improved chain, Fig. 2 is a side view of one of the clips detached, Fig. 3 is a top plan view of Fig. 2, and Fig. 4 is a section on the line 4—4 of Fig. 2, looking in the direction of the arrows adjacent to the line.

The present embodiment of the invention is shown in connection with a wheel 1, having a pneumatic tire 2ª, and the improvement consists of a series of arc-shaped plates 2, each of which is provided on its convex surface with three spurs or lugs, namely, a central V-shaped spur 3—3ª and lateral lugs 4.

The spur 3—3ª consists of portions 3 and 3ª, respectively, extending at approximately a right angle with respect to each other, and the apex of the lug is at the center of the plate 2. The lugs 4 are approximately straight, and are arranged with their long axes inclined with respect to the base of the plate 2. The lugs 4 are approximately parallel with the portions 3 and 3ª of the first-named lug, one lug 4 being parallel with the portion 3, and the other with the portion 3ª. Each lug 4 is braced at the face remote from the lug 3—3ª, and at the center of the said face by a buttress 5, the said buttresses being integral with the plate 2 and with the lugs 4.

The plates are connected by flexible members 6, chains in the present instance, and the chains are arranged in pairs, each pair connecting adjacent ends of adjacent plates 2. Each of the said plates is provided at each end with a slot 7, the said slots extending longitudinally of the plates, and at the outer side of each slot a portion of the plate is offset outwardly as indicated at 8, a distance such that the inner face of the portion 8 is approximately flush with the outer surface of the plate 2.

The slots at each end of the plates are parallel, and since the portions outside of the slots are offset outwardly, these portions provide outwardly offset lugs for the attachment of the chains 6. The chains have hooks or loops 9 at their ends for engaging the portions 8, the said hooks or loops passing through the slots 7 and around the portions 8. The plates 2 are of such length that when in place on the wheel the ends of the plates will be near the rim of the wheel, but spaced sufficiently from the rim so that the said ends will never touch the rim when the wheel is in use.

The spurs or lugs 3—3ª and 4 are all inclined to the direction of movement of the wheel, and the chain is so arranged that the apices of the lugs 3—3ª are forward. For this reason the portions 3 and 3ª diverge rearwardly, and each gripping plate 2 has holding lugs that are inclined in opposite direction to counteract slipping of the wheel either inwardly or outwardly with respect to the vehicle.

The spacing of the plates with respect to each other will depend upon the character of the vehicle, the size of the wheel and other conditions, but it will be obvious that they may be arranged as near together or as far apart as may be desired. They should be spaced in such manner that at least one plate will be in contact with the supporting surface of the wheel at all times, and in such manner that before one plate leaves the ground another plate will be in engagement therewith.

The length of the plates 2 is such that the chains 6 are on opposite sides of the wheel and near the rim. The plates not only prevent rotary or lateral slipping of the wheel but also prevent skidding. The arrangement of the lugs 3—3ª and 4 reinforce the plate 2 to prevent collapse of the arch of the plate. The planes of the lugs are almost perpendicular to the adjacent surfaces of the plates, and it will be noticed that each lug is of a greater thickness at the plate than at the free edge of the lug. The planes of the lugs also overlap at their adjacent ends, so that the three lugs form a broken reinforcing rib extending over one-half the length of the plate and at the arch. It will be noticed from an inspection of Fig. 4 that each plate is slightly convex transversely on its inner face to prevent the collection of foreign bodies between the plate and the tire. Any foreign bodies such as gravel or the like, that might be caught between a plate and the tire will be thrown out by centrifugal force in the rotation of the wheel. This convex construction also prevents injury to the tire from the side edges of the plates. Were the side edges in contact with the tire they would chafe and cut the tire in the course of time. With the convex surface however, the side edges do not contact with the tire at any time.

The arrangement of the lugs also reinforces the plates transversely, since the lugs extend transversely as well as longitudinally of the plate, and they brace the plate throughout practically the entire width thereof. It will be noticed that the portions of each central lug diverge from the transverse central line of the plate at the same angle.

I claim:—

In a tire chain, a holding plate arched longitudinally to fit a tire and having central and lateral lugs on its convex face, the central lug being V-shaped and having its apex toward one side edge of the plate and its base toward the other side edge, each lateral lug being approximately parallel with the adjacent side of the V-shaped lug and having a buttress at its center on the opposite face from the central lug.

LEE W. CLASKA.

Witnesses:
R. E. WHITTEN,
FRANCIS J. CASTLE.